United States Patent [19]

Schraft et al.

[11] Patent Number: 4,784,254
[45] Date of Patent: Nov. 15, 1988

[54] METHOD AND APPARATUS FOR INCREASING THE NUMBER OF LONGITUDINAL ROWS OF ADVANCING BAKERY ARTICLES

[75] Inventors: Horst Schraft, Stuttgart; Horst Wilcewski, Kornwestheim, both of Fed. Rep. of Germany

[73] Assignee: Werner & Pfleiderer GmbH, Stuttgart, Fed. Rep. of Germany

[21] Appl. No.: 136,552

[22] Filed: Dec. 22, 1987

[30] Foreign Application Priority Data

Dec. 22, 1986 [DE] Fed. Rep. of Germany ....... 3644058

[51] Int. Cl.$^4$ .............................................. B65G 47/26
[52] U.S. Cl. ...................................... 198/434; 198/445
[58] Field of Search ............... 198/420, 436, 432, 438, 198/440, 442, 445, 447, 434, 617

[56] References Cited

U.S. PATENT DOCUMENTS

| | | | | |
|---|---|---|---|---|
| 2,451,104 | 10/1948 | Lowe | ................................ | 198/442 |
| 2,612,852 | 10/1952 | Morrison | ............................ | 198/436 |
| 3,598,221 | 8/1971 | Klimaschka et al. | ............... | 198/432 |
| 4,718,535 | 1/1988 | Wolff | .................................... | 198/432 |

FOREIGN PATENT DOCUMENTS 1241341 5/1967 Fed. Rep. of Germany ...... 198/432
2200856 7/1973 Fed. Rep. of Germany ...... 198/434

Primary Examiner—Joseph E. Valenza
Attorney, Agent, or Firm—Roberts, Spiecens & Cohen

[57] ABSTRACT

A method and apparatus for increasing the number of longitudinal rows of bakery articles which are being advanced on an oven conveyor belt in longitudinal and transverse rows according to which there are formed a number n of identical groups of directly adjacent longitudinal rows corresponding to the number of additional longitudinal rows, n being a whole number equal to the number of longitudinal rows initially present divided by the number of groups. From each of the longitudinal rows initially present, one article is removed for every n+1 transverse rows. The articles taken from each group are then arranged to form one additional longitudinal row and the additional longitudinal rows are added to the initially present longitudinal rows. The articles are removed by an oblique suction conveyor belt which is provided with suction cups above a conveyor belt for the articles. The removed articles are transferred to an auxiliary conveyor path along which there is provided for each group of longitudinal rows, a guide rail extending obliquely to the angle of conveyance to form an additional longitudinal row.

15 Claims, 2 Drawing Sheets

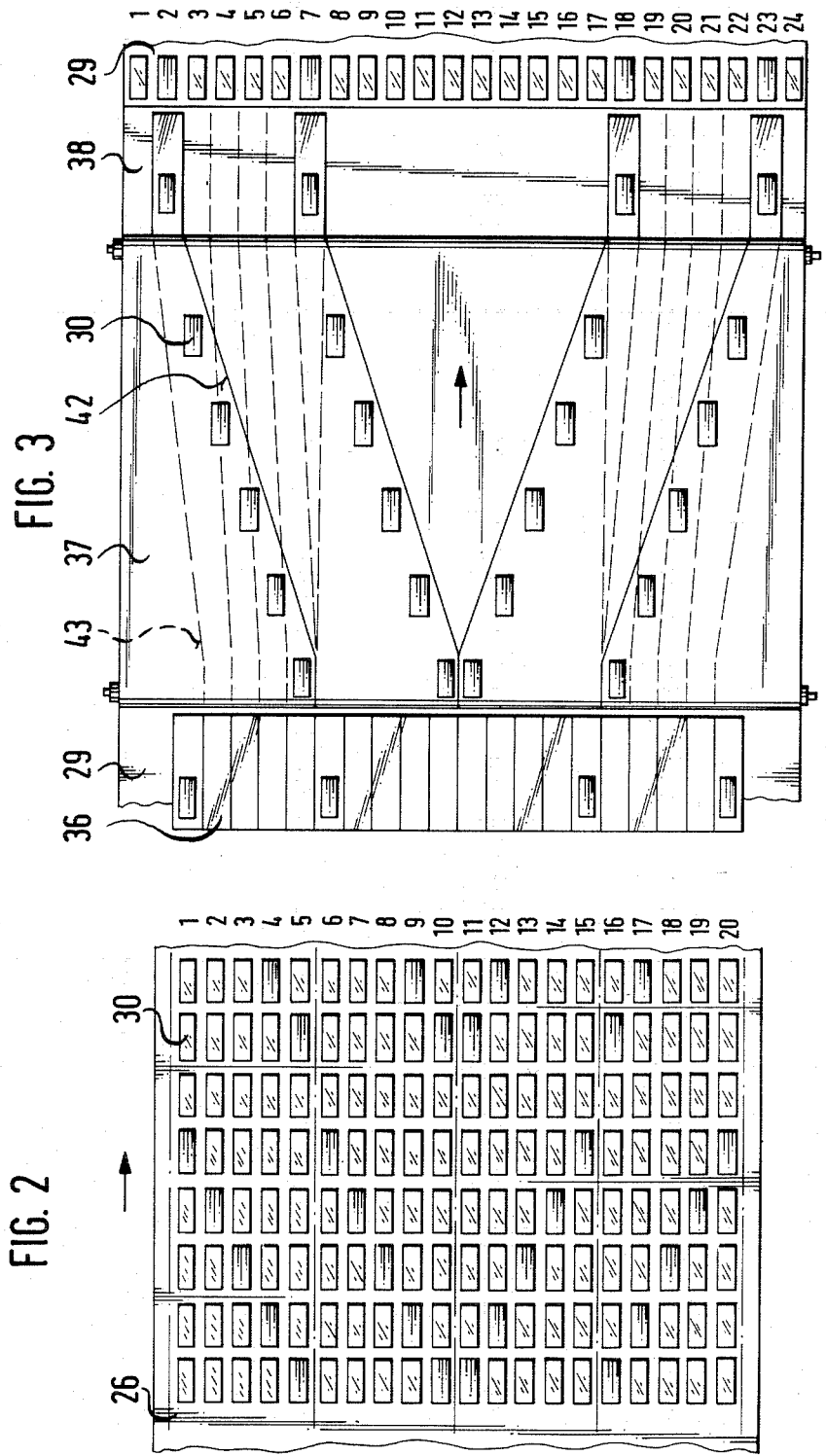

METHOD AND APPARATUS FOR INCREASING THE NUMBER OF LONGITUDINAL ROWS OF ADVANCING BAKERY ARTICLES

FIELD OF THE INVENTION

The present invention relates to a method and apparatus for rearranging bakery articles which are advancing in longitudinal and transverse rows so that the number of longitudinal rows is increased.

DESCRIPTION OF PRIOR ART

In the industrial manufacture of bakery articles, particularly cookies and crackers, the baking is effected in continuously operating tunnel ovens on the conveyor belt of which the bakery articles are arranged in a precisely arranged association of longitudinal and transverse rows. The conveyor belt of the baking oven is a part of a conveyor path on which the bakery articles cool after leaving the oven and are transported to packaging machines.

Packaging machines are arranged at the downstream end of the conveyor path and have a given number of feed chutes which, in the ideal case, corresponds to the number of longitudinal rows of bakery articles present on the oven conveyor belt. Since the width of the oven conveyor belt is constant, if there is a change in the width or diameter of the bakery articles, there will be a different number of longitudinal rows of bakery articles on the oven conveyor belt and this will no longer correspond to the number of feed chutes of the packaging machines. Depending on the number of longitudinal rows of baked articles present on the oven conveyor belt, the number of longitudinal rows on the conveyor path must be increased or reduced in order to correspond to the number of feed chutes. In this respect, a uniform distribution of the bakery articles over all longitudinal rows is important since otherwise the packaging machines will be loaded unequally. In the present matter, only an increase in the number of rows will be considered.

A device for increasing the number of rows is known and comprises an arrangement of laterally displaceable flaps on a chute which is provided between two conveyor belts of a conveyor path. Each of these flaps is arranged between two channels which are located alongside of each other on the chute and are displaced in such a manner by a cam that bakery articles are alternately conducted into one or the other channel. The displacement of the flaps is effected independently of each other in a given sequence so as to obtain a uniform distribution of the bakery articles. As a result of this course of motion and of the forces of inertia which occur upon the back and forth movement, the capacity of the device is limited. Due to the arrangement of the flaps, the increase is effected only by one longitudinal row. For more than one additional longitudinal row it is therefore necessary to arrange several devices of the known type parallel to each other or one behind the other in the conveyor path. This results in a considerable expense. The complicated control of the flaps in the known device is furthermore susceptible to breakdown and is difficult to maintain.

In the art of baking, suction conveyor belts provided with suction cups are used to lift loaves of bread out of baking tins. A so-called de-tinner which is provided with such a suction conveyor belt is shown in U.S. Pat. No. 3,170,581. The endless suction conveyor belt is provided uniformly on its surface with suction cups and its lower run is aligned with the bread loaves contained in tins which are fed on a first conveyor synchronously with the movement of the suction conveyor belt. In this case, a larger number of suction cups, which are connected where they are on the lower run of the belt to a source of vacuum, come into contact with the top of the loaf of bread. After the loaf of bread has been grasped by the suction cups, the paths of the suction conveyor belt and of the first conveyor diverge in vertical direction, as a result of which the loaves of bread are removed from the tins and conducted, upon the further movement of the suction conveyor belt, above a second conveyor and deposited thereon by the interruption of the suction. The empty tins are removed on the first conveyor.

SUMMARY OF THE INVENTION

An object of the present invention is to provide a method and apparatus for increasing the number of longitudinal rows of advancing bakery articles which is of simple construction and high capacity and can be used for different increases in the number of rows.

This object is achieved by the method of the invention by the steps comprising advancing a plurality of bakery articles along a conveyor path in longitudinal and transverse rows, the longitudinal rows being arranged in equal groups in which the number n of longitudinal rows in each group is equal to the total number of longitudinal rows divided by the number of groups, removing, at a removal station, one article from each longitudinal row after passage of $n+1$ transverse rows at said station, advancing the removed articles along a path in which the removed articles form one additional longitudinal row for each said group;

guiding the advancing articles beyond the removal station to adjust the transverse spacing of longitudinal rows to provide a number of spaces equal to the number of additional rows, and inserting into said spaces the removed articles in said additionally formed longitudinal rows.

The object of the invention is achieved by the apparatus comprising first conveyor means for advancing a plurality of bakery articles along a conveyor path in longitudinal and transverse rows, the longitudinal rows being arranged in equal groups in which the number n of longitudinal rows in each group is equal to the total number of longitudinal rows divided by the number of groups, means for removing, at a removal station, one article from each longitudinal row after passage of $n+1$ transverse rows at said station, second conveyor means for advancing the removed articles along a path in which the removed articles are formed into one additional longitudinal row for each said group;

means for guiding the advancing articles beyond the removal station to adjust the transverse spacing of longitudinal rows to form a number of spaces equal to the number of additional rows, and means for inserting into said spaces the removed articles in the additionally formed longitudinal rows.

By the removal of individual bakery articles from the advancing baker articles in order to form additional longitudinal rows, the basic arrangement thereof is not disturbed. The bakery articles which are not removed retain their place on the conveyor path so that damage to delicate bakery articles such as, for instance, crackers is substantially avoided.

The teaching accordance with the invention by which the bakery articles are removed permits numerous variations in the increase in rows. It also provides assurance that in each additional longitudinal row exactly as many bakery articles are fed to the subsequent packaging machines as in the other longitudinal rows present on the conveyor path.

By the use of a conventional suction conveyor belt with suction cups, the bakery articles taken from the longitudinal rows initially present also are assured gentle handling. For operating this suction conveyor belt, no complicated control is required. As a revolving structural part, the suction conveyor belt can be used without limitation even in conveyor paths of high capacity. For adaptation to different increases in rows it is merely necessary to change the arrangement and possibly the number of suction cups.

BRIEF DESCRIPTION OF THE FIGURES OF THE DRAWING

FIG. 2 is a top plan view of a front part of the apparatus of FIG. 1.

FIG. 3 is a top plan view of a rear part of the apparatus of FIG. 3.

DETAILED DESCRIPTION OF A PREFERRED EMBODIMENT

Figure 1:
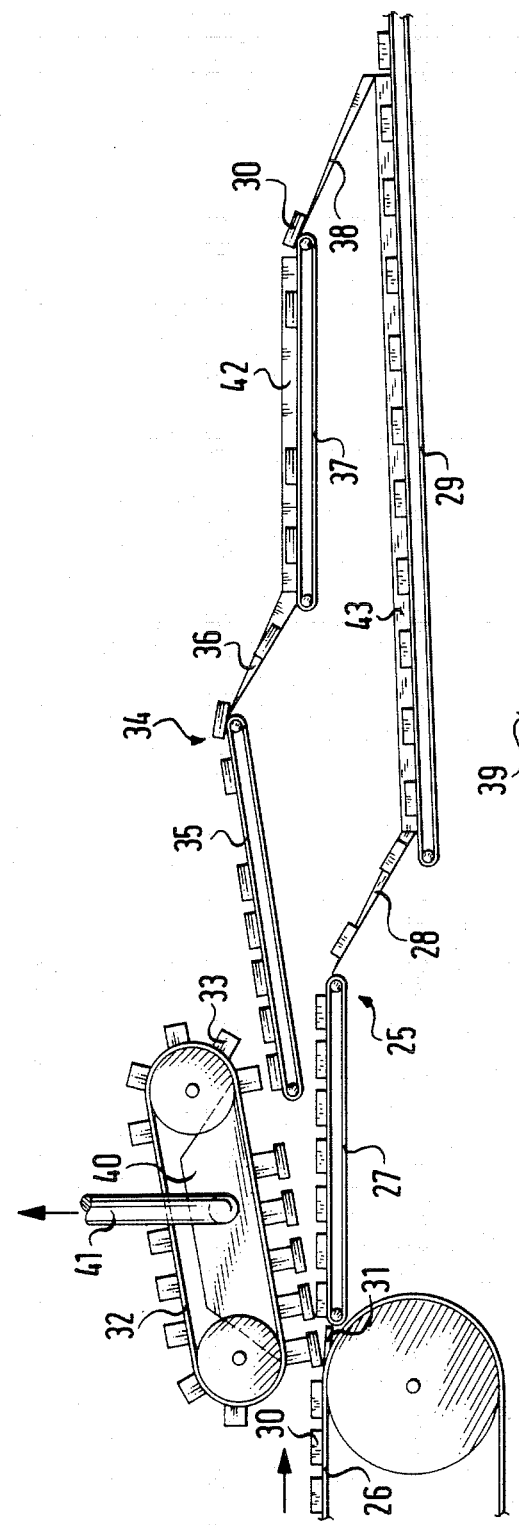
FIG. 1 is a diagrammatic side view of a conveyor path for bakery articles including apparatus for increasing the number of longitudinal rows.

FIG. 1 shows a substantially horizontal conveyor path 25 which, in the direction of conveyance to the right, consists of an oven conveyor belt 26, a delivery belt 27, an arranger 28 and a feed belt 29 in succession. The feed belt leads to packaging machines (not shown). The bakery articles 30 in the form of crackers, cookies or the like are advanced on the oven conveyor belt 26 and they are detached from the surface of the oven conveyor belt at a removal station by a removal knife 31 of wedge-shaped cross section which also bridges over the space between the upper run of the oven conveyor belt 26 and the delivery belt 27.

Above the conveyor path 25 and within the region of the oven conveyor belt 26 and the delivery belt 27 there is disposed a suction conveyor belt 32 which is provided with resilient suction cups 33 in an arrangement described later. The suction conveyor belt 32 is moved in synchronism with the oven conveyor belt 26 and has the same width as the latter. The mouths of its suction cups 33 which are present on the lower run of belt 32 are tangent to the articles 30 at the point of the oven conveyor belt 26 at which the crackers have been loosened by the removal knife. The suction conveyor belt 32 extends to a location above the starting point of an auxiliary conveyor path 34 which is located generally above the conveyor path 25. The conveyor path 34 consists in succession of a removal belt 35, an arranger 36, an auxiliary transport belt 37 and a further arranger 38. The individual components of the conveyor path 25, the suction conveyor belt 32, and the auxiliary conveyor path 34 are supported on a base surface 39 by a frame (not shown).

The suction conveyor belt 32 has, in known manner, openings which extend into the interior of the suction cups 33. The lower run of the suction conveyor belt 32 communicates with an air box 40 which is connected via a line 41 to a suction source (not shown). Thus, in the region of the lower run, the suction cups 33 are under the action of a vacuum. Each of the suction cups can hold an article 30 which it contacts on the oven conveyor belt 26 and transports the article, by the movement of the suction conveyor belt 32, up over the removal belt 35 of the auxiliary conveyor path 34. As soon as the suction cups 33 have moved out of the region of the lower run of the suction conveyor belt 32, the action of the suction terminates and the articles 30 are deposited by gravity onto the removal belt 35. In order that the articles 30 which are to be removed are lifted off the conveyor path 25 immediately when they are contacted by the suction cups 33, the suction convey or belt 32 is directed obliquely upwards. The removal belt 35 is arranged in the same upwardly inclined position so that the articles 30 which have been removed are deposited substantially without free fall and therefore very gently.

As can be seen in FIG. 2, the articles 30 are arranged on the oven conveyor belt 26 in a precise association of longitudinal and transverse rows which are at right angles to each other. The longitudinal rows are numbered consecutively from 1 to 20. In the illustrated example, the initial number of longitudinal rows is to be increased by four additional longitudinal rows by rearrangement of the articles 30. In this regard, the condition is to be satisfied that, after the rearrangement, the same number of articles are then present in each of the then existing 24 longitudinal rows. This is achieved in the following manner.

The 20 longitudinal rows initially present is subdivided into groups equal to the number of additional longitudinal rows, namely into four equal groups. This subdivision is indicated in FIG. 2 by chain dotted longitudinal lines. In each case the longitudinal rows 1–5, 6–10, 11–15 and 16–20 form a group. Each of these groups comprises n=5 longitudinal rows, n being a whole number equal to the number of longitudinal rows initially present (in this case 20) divided by the number of groups (in this case 4). From each of the longitudinal rows 1 to 20 initially present, one article 30 is now removed after every n+1=6 transverse rows. The articles to be removed are shown hatched. The removal of the articles is effected by means of the suction conveyor belt 32 whose suction cups 33 are located precisely in the same arrangement as the hatched articles 30 on the oven conveyor belt 26.

As can be seen from the arrangement of the hatched articles 30 in FIG. 2, within a group the articles 30 are removed from adjacent longitudinal rows in each case one transverse row apart in the direction of conveyance. Such a staggered removal makes it possible, in simple fashion, to arrange the articles 30 which have been taken in each case from one group in an additional longitudinal row on the auxiliary conveyor belt 37. For this purpose, four stationary guide rails 42 are provided in the oblique arrangement shown in FIG. 3 above the upper run of the auxiliary conveyor belt 37. By each of these guide rails 42 the articles 30 of a group which are present on the auxiliary conveyor path 34 undergo a lateral displacement by which they are brought together to form one additional longitudinal row. The additional longitudinal rows are fed at the end of the auxiliary conveyor path 34 via the arranger 38 to the conveyor path 25 at a point distant from the place of removal. On the conveyor belt 29 there are then present, in addition to the longitudinal rows originally present, four additional longitudinal rows, which altogether are numbered continuously as 1 to 24. The numbers 2, 7, 18 and 23 are associated with the additional longitudinal rows. In order to create space for the additional longitudinal rows within the association of longitudinal row initially present on belt 29, the outer five longitudinal rows at both ends are spread outwardly by means of stationary guide rails 43, shown in dotted lines in FIG. 3, arranged above the conveyor belt 29.

The arrangers 28, 36 and 38 are known devices which are provided in each case at the location where a precise alignment of longitudinal rows of articles is necessary, as for example at the place of transfer onto conveyor paths with guide rails. The arrangers consist of longitudinal troughs whose walls rise gradually from a base surface. As a result, any articles which may have come somewhat out of the longitudinal direction automatically slide into the center of the trough and thus return to their predetermined path.

Although the invention has been described in relation to a specific embodiment thereof, it will become apparent to those skilled in the art that numerous modifications and variations can be made within the scope and spirit of the invention as defined in the attached claims.

What is claimed is:

1. A method of rearranging a plurality of bakery articles which are being advanced in longitudinal and transverse rows such that the number of longitudinal rows is increased, said method comprising
   advancing a plurality of bakery articles along a conveyor path in longitudinal and transverse rows, the longitudinal rows being arranged in equal groups in which the number n of longitudinal rows in each group is equal to the total number of longitudinal rows divided by the number of groups,
   removing, at a removal station, one article from each longitudinal row after passage of n+1 transverse rows at said station,
   advancing the removed articles along a path in which the removed articles form one additional longitudinal row for each said group,
   guiding the advancing articles beyond the removal station to adjust the transverse spacing of longitudinal rows to provide a number of spaces equal to the number of additional rows; and
   inserting into said spaces the removed articles in said additionally formed longitudinal rows.

2. A method as claimed in claim 1 wherein within each group, said articles are successively removed from adjacent longitudinal rows staggered by one transverse row in the direction of advance.

3. A method as claimed in claim 1 wherein the removal of the articles and their subsequent insertion into the vacant spaces for the additional longitudinal rows takes place at longitudinally spaced locations in the direction of advance.

4. A method as claimed in claim 1 wherein said articles are removed from each row along an upwardly diverging path from the advancing articles.

5. A method as claimed in claim 4 wherein the removed articles are deposited onto a conveyor belt and transported along a path of travel parallel to said upwardly diverging path.

6. A method as claimed in claim 1 wherein the removed articles in each of said groups are advanced along a common path which is inclined with respect to said longitudinal rows in order to form the additional row corresponding to said group.

7. Apparatus for rearranging a plurality of bakery articles which are being advanced in longitudinal and transverse rows such that the number of longitudinal rows is increased, said apparatus comprising
   first conveyor means for advancing a plurality of bakery articles along a conveyor path in longitudinal and transverse rows, the longitudinal rows being arranged in equal groups in which the number n of longitudinal rows in each group is equal to the total number of longitudinal rows divided by the number of groups,
   means for removing, at a removal station, one article from each longitudinal row after passage of n+1 transverse rows at said station,
   second conveyor means for advancing the removed articles along a path in which the removed articles are formed into one additional longitudinal row for each said group;
   means for guiding the advancing articles beyond the removal station to adjust the transverse spacing of selected longitudinal rows to form a number of spaces equal to the number of additional rows, and
   means for inserting into said spaces the removed articles in the additionally formed longitudinal rows.

8. Apparatus as claimed in claim 7 wherein said first conveyor means comprises a first conveyor belt on which said articles travel along said conveyor path, and said means for removing articles comprises a suction conveyor belt movable in synchronism with the first conveyor belt, said suction conveyor belt including suction cups and having a lower run disposed so that said suction cups travel along a path to remove selected articles from said first conveyor belt, said second conveyor means being positioned to receive the removed articles from said suction cups.

9. Apparatus as claimed in claim 8 wherein said suction conveyor belt is disposed above said first conveyor belt and includes a suction source for application of suction to the suction cups to remove the articles from the first conveyor belt, said suction conveyor belt projecting above said second conveyor means for depositing the removed articles thereon.

10. Apparatus as claimed in claim 9 wherein said suction conveyor belt extends obliquely upwards in the direction of conveyance of the articles.

11. Apparatus as claimed in claim 9 wherein said second conveyor means includes guides for guidably advancing the separated articles to form the articles into said additional longitudinal rows.

12. Apparatus as claimed in claim 11 wherein said guides extend at an angle to the longitudinal rows and advance the removed articles in each group along an inclined path to form an individual added row from each group.

13. Apparatus as claimed in claim 11 further comprising a further conveyor belt on which the articles travel after articles are moved at said removal station, said means for guiding the advancing articles to form spaces for additional rows comprising further guides associated with said further conveyor belt.

14. Apparatus as claimed in claim 13 wherein said second conveyor means for the removed articles is located above the further conveyor belt, said means for inserting the removed articles into the additionally formed longitudinal rows comprises means for depositing the removed articles onto the further conveyor belt from said second conveyor means.

15. Apparatus as claimed in claim 9 wherein said lower run of said suction belt is disposed at an angle relative to said conveyor path.

* * * * *